United States Patent
Nagata et al.

[15] 3,681,362
[45] Aug. 1, 1972

[54] PROCESS FOR THE PREPARATION OF ISOQUINUCLIDINE ALKALOIDS

[72] Inventors: Wataru Nagata, Nishinomiya-shi; Shoichi Hirai, Ibaraki-shi, both of Japan

[73] Assignee: Shionogi & Co., Ltd., Osaka, Japan

[22] Filed: June 6, 1969

[21] Appl. No.: 832,878

[30] Foreign Application Priority Data

June 29, 1968 Japan..........................43/45279

[52] U.S. Cl. ...260/293.53, 260/239.3 P, 260/293.52, 260/293.54, 260/326.14 R, 424/267
[51] Int. Cl. ..............................................C07d 43/38
[58] Field of Search....260/293 DA, 294.3 E, 293.53, 260/293.54

[56] References Cited

UNITED STATES PATENTS

| | | | |
|---|---|---|---|
| 2,877,229 | 3/1959 | Taylor | 260/293.2 |
| 3,516,989 | 6/1970 | Sallay | 260/239 |

OTHER PUBLICATIONS

Hirai et al., Chem. Commun. 1968 (17), 1,016–1,017.
Büchi et al., J. Am. Chem. Soc. 88 (11), 2532–5 (1966).

*Primary Examiner*—Henry R. Jiles
*Assistant Examiner*—G. Thomas Todd
*Attorney*—Wenderoth, Lind & Ponack

[57] ABSTRACT

A process for totally synthesizing isoquinuclidine alkaloids, particularly the iboga alkaloids involving a carboxylic acid ester residue at the position 18, starting from 2-indole acetylisoquinuclidine-6-ones.

5 Claims, No Drawings

PROCESS FOR THE PREPARATION OF ISOQUINUCLIDINE ALKALOIDS

The present invention relates to a process for the preparation of a series of known and useful alkaloids of isoquinuclidine-type, the components of the iboga plants (Apocynaceae), particularly the alkaloids involving a carboxylic acid ester residue at the position 18, such as coronaridine, voacangine, isovoacangine, conopharyngine, 4-epicoronaridine, desethyl-coronaridine and related compounds. The compounds prepared in the present invention may be represented by the following general formula (I):

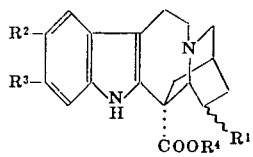

(wherein $R^1$ represents a hydrogen atom of lower alkyl group; $R^2$ and $R^3$ are the same or different, representing a hydrogen atom or lower alkoxy group; and $R^4$ represents methyl or ethyl group)

The process of the present invention may be indicated by the following reaction sequence:

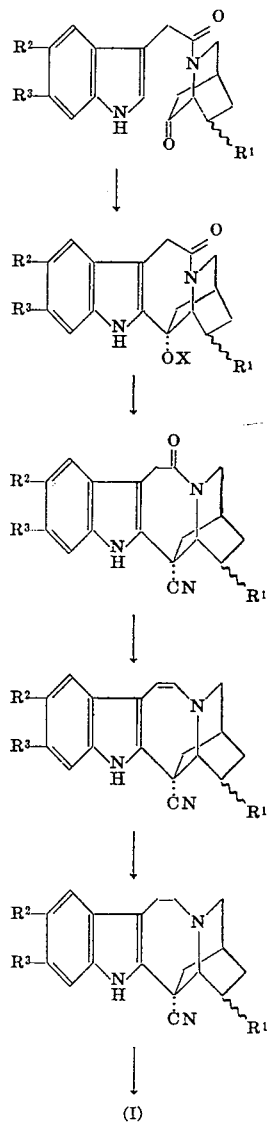

(wherein $R^1$, $R^2$ and $R^3$ each has the same meanings as described above; and X represents a sulfonic acid residue)

and comprises reacting starting N-indoleacetylisoquinuclidine derivative (II) with a sulfonic acid derivative to yield a sulfonyloxy derivative (III), reacting the later with a cyano compound to yield a cyano derivative (IV), subjecting the latter to reduction by a metal hydride to yield an enamine derivative (V), hydrogenating the latter to yield a compound (VI), and then subjecting the latter to hydrolysis followed by esterification to yield the objective compound (I).

The starting compounds (II) of the present invention may be prepared by reacting a 3-cyclohexene-1-methylamine (VII) with lead tetraacetate to yield an aziridine (VIII), reacting the latter with an indoleacetic anhydride (IX) to yield a compound (X), and then oxidizing the latter. The reaction sequence can be depicted by the accompanying equation.

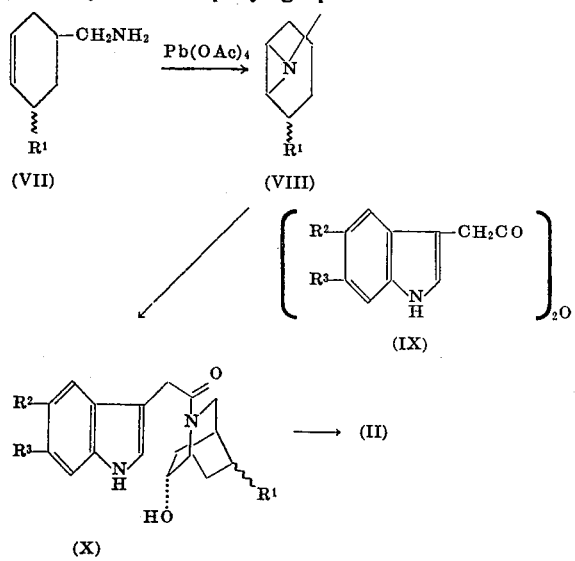

(wherein $R^1$, $R^2$ and $R^3$ each has the same meanings as described above)

Each substituent in the objective compounds (I) is exemplified as follows: $R^1$ is a hydrogen atom or a lower alkyl group such as methyl, ethyl, propyl, butyl or the like; $R^2$ and $R^3$ are the same or different and each is a hydrogen atom or a lower alkoxy group such as methoxy, ethoxy, propoxy or the like; and $R^4$ is methyl or ethyl group. Representative of the objective compounds (I) are coronaridine ($R^1= C_2H_5$; $R^2= R^3= H$; $R^4= CH_3$), voacangine ($R^1= C_2H_5$; $R^2= OCH_3$; $R^3= H$; $R^4= CH_3$), isovoacangine ($R^1= C_2H_5$; $R^2= H$; $R^3= OCH_3$; $R^4= CH_3$), conopharyngine ($R^1= C_2H_5$; $R^2= R^3= OCH_3$; $R^4= CH_3$), 4-epicoronaridine ($R^1=C_2H_5$(epi); $R^2= R^3= H$; $R^4= CH_3$), desethylcoronaridine ($R^1= R^2= R^3= H$; $R^4= CH_3$) and the like.

The process of the present invention consists of five steps, that is, the intramolecular cyclization reaction of the starting compounds (II) carried out in the presence of a sulfonic acid derivative [the first step], replacement of the sulfonic acid residue into cyano group [the second step], reduction of the carbonyl group at the position 7 by a metal hydride [the third step], hydrogenation of the enamine double bond [the fourth step], and conversion of cyano group into carboxylic acid ester [the fifth step]. Each step is more precisely indicated as follows.

In the first step, the starting compound (II) is subjected to intramolecular cyclization reaction in the presence of a sulfonic acid derivative as acid catalyst, accompanied by introduction of a sulfonic acid residue in the position 18 of the isoquinuclidine nucleus formed. The sulfonic acid derivatives used in this step are methanesulfonic acid, benzenesulfonic acid, p-toluenesulfonic acid, bromobenzenesulfonic acid and the like. The reaction solvent, an optional one inert to the reaction, may be used. For example, an aprotic solvent such as a hydrocarbon solvent, e.g. benzene, toluene etc., an ether, e.g. diethyl ether, tetrahydrofuran, dioxane, diglyme etc., a halogenated hydrocarbon solvent, e.g. chloroform, dichloromethane, dichloroethane etc., or acetonitrile, or protic solvent such as acetic acid may be used. More preferably, a non-polar solvent such as benzene, toluene or the like is normally used. The reaction proceeds well at room temperature or under heating, more preferably under the reflux temperature of the reaction medium.

The second step, replacement of a sulfonic acid residue into cyano group in the position 18, is carried out by reacting the sulfonyloxy derivative (III) with an alkali metal cyanide such as sodium cyanide, potassium cyanide, lithium cyanide or the like in a polar solvent. The polar solvents used in this step are, for example, acetonitrile, dimethylsulfoxide, dimethylformamide, and the like. The reaction may be carried out at a wide range of temperature ranging room temperature to the reflux temperature of the reaction medium. The reaction is usually carried out under refluxing.

The third step, reduction of the carbonyl group at the position 7, is carried out according to the reduction condition of carbonyl group by a so-called metal hydride. The metal hydrides used in this step are complex metal hydrides such as lithium aluminum hydride, lithium diethoxyaluminum hydride, lithium trimethoxyaluminum hydride, lithium triethoxyaluminum hydride and the like or aluminum hydrides such as aluminum hydride, dimethylaluminum hydride, diethylaluminum hydride, diisobutylaluminum hydride, ethoxyaluminum hydride, diethoxyaluminum hydride, dichloroaluminum hydride and the like. The reaction may be carried out in an aprotic solvent, particularly in a benzene-type or ether-type solvent. Since the compound (IV) to be reduced involves the cyano group (18-position) in the same molecule which may be reduced simultaneously by the metal hydride, it is necessary to use the reaction condition suitable to the selective reduction of the lactam group without attacking the cyano group. For example, the reduction of the compound (IV) by diisobutylaluminum hydride in tetrahydrofuran or benzene under refluxing affords the 18-aminomethyl derivative in which the cyano group has been reduced together with the lactam group. Accordingly, the reaction may preferably be carried out by using a substituted or unsubstituted reagent of aluminum hydride in an ether solvent under ice-cooling (e.g. −20° to 0° C) or at a very low temperature (e.g. −80° to −20° C).

In the fourth step, the 7,8-double bond of the enamine derivative (V) prepared in the preceding step is catalytically hydrogenated according to the usual method. The reaction may be carried out by dissolving the enamine derivative (V) in a suitable solvent and then shaking or stirring in the presence of a suitable catalyst under hydrogen atmosphere. The reaction proceeds well at room temperature under atmospheric pressure. The catalysts used in this step are palladium catalysts (e.g. palladium black, palladium-carbon, palladium-barium sulfate etc.), rhodium catalysts (e.g. rhodium-carbon, rhodium-alumina etc.), platinum catalysts (e.g. platinum oxide etc.), nickel catalysts (e.g. Raney nickel etc.) and the like. The suitable solvents are alcohols (e.g. methanol, ethanol, propanol, t-butanol etc.), ethers (e.g. diethyl ether, tetrahydrofuran etc.), ethyl acetate and the like.

In the fifth step, the 18-cyano group is hydrolyzed to the carboxylic acid and further converted into the methyl or ethyl ester, the objective compound of the present invention. The hydrolysis may be accomplished under catalysis with either an acid (e.g. hydrochloric acid, sulfuric acid etc.) or a base (e.g. sodium hydroxide, potassium hydroxide etc.) in a suitable solvent. The suitable solvents used are alcohols (e.g. methanol, ethanol, propanol, n-butanol, t-butanol, ethylene glycol, diethylene glycol, triethylene glycol, methyl cellosolve etc.), ethers (e.g. tetrahydrofuran, dioxane, ethylene glycol dimethyl ether, diethylene glycol dimethyl ether etc.), dimethylsulfoxide and the like. However, since the cyano group of the compound (VI) is located at the sterically hindered tertiary position, the reaction may preferably be carried out under a relatively drastic condition, i.e. at an elevated temperature, such as 50° – 200° C, more preferably 150° –180° C, in a higher boiling solvent (e.g. diethylene glycol, triethylene glycol etc.) for an extended heating period (e.g. for 10 – 30 hours). The subsequent esterification may be carried out according to the conventional manner such as the silver salt method by treatment of the silver salt of the intermediary acid with methyl or ethyl halide or the method by reaction with diazomethane or diazoethane.

The final products (I) of the present invention are identified with the authentic specimens isolated or prepared from the corresponding natural products by the comparison of the physical constants such as infrared absorption spectra, mass spectra, nuclear magnetic resonance spectra, and so forth. For convenience, the following formula provides the numbering of these compounds.

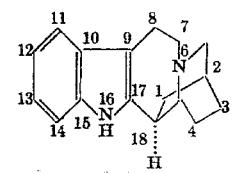

The final compounds (I) prepared in the present invention exhibit cardiac activity, anti-convulsive activity against various kinds of shocks (e.g. electric shock), locomotive activity, reserpin-antagonism, jactatio capitis, catalepsy and the like, and are employed as medicaments. They can be administered in a variety of per se conventional ways, e.g. in the form of tablets or injections constituted e.g. by an effective single dose of active compound of the invention and a major proportion of a per se conventional carrier.

Furthermore, the compounds (I) of the present invention are useful as intermediates for the preparation of antineoplastic agents, i.e. vinblastine and vincristine.

In practice, the present invention will be better explained by the following examples which are not intended to limit the scope of the invention.

EXAMPLE 1 a. A portion of a solution of 1 g of 2-indoleacetyl-7-ethylisoquinuclidin-6-one in 80 ml of anhydrous benzene is distilled off as azeotropic mixture to dry the solution. Thereafter, 835 mg of anhydrous p-toluenesulfonic acid is added and the solution is then refluxed for 5 minutes in nitrogen atmosphere with stirring while benzene is moderately distilled off. The reaction mixture is cooled, and then immediately poured into cooled 7 percent sodium carbonate solution and the product is extracted with dichloromethane. The extract is dried over anhydrous sodium sulfate and evaporated to dryness under reduced pressure to yield 1.46 g of 18-p-toluenesulfonyloxyibogamine lactam as a light yellowish non-crystalline material. IR: $\nu_{max}^{CHCl_3}$ 3446, 1637, 1365, 1173 cm$^{-1}$.

According to the same procedure, 2-(5-methoxyindoleacetyl)-7-ethylisoquinuclidin-6-one is converted to 18-p-toluenesulfonyloxyibogaine lactam, 2-(6-methoxyindoleacetyl)-7-ethylisoquinyclidin-6-one to 18-p-toluenesulfonyloxytabernanthine lactam, 2-(5,6-dimethoxyindoleacetyl)-7-ethylisoquinuclidin-6-one to 18-p-toluenesulfonyloxyibogaline lactam, and 2-indoleacetyl-7 ethylisoquinuclidin-6-one to 18-p-toluenesulfonyloxy-4-epi-ibogamine lactam, respectively.

b. To a solution of 1.46 g of 18-p-toluenesulfonyloxyibogamine lactam in 70 ml of acetonitrile is added 5.5 g of potassium cyanide and the solution is heated at 70° –75° C for 15 hours in nitrogen atmosphere with vigorous stirring. After cooling, the reaction mixture is poured into ice-water and the product is extracted with dichloromethane, washed with water, dried over anhydrous sodium sulfate, and then evaporated to dryness under reduced pressure to yield 1.03 g of a light reddish oily material, which is chromatographed on 30 g of neutral alumina. Eluates with benzene-dichloromethane (2 : 1) or dichloromethane are recrystallized from dichloromethane-ether to yield 217.2 mg of 18-cyanoibogamine lactam having mp. 270 - 280° C. IR: $\nu_{max}^{CHCl_3}$ 3440, 2220, 1655, 1457, 1408, 1339, 1303 cm$^{-1}$.

According to the same procedure, 18-p-toluenesulfonyloxyibogaine lactam is converted to 18-cyanoibogaine lactam, 18-p-toluenesulfonyloxytabernanthine lactam to 18-cyanotabernanthine lactam, 18-p-toluenesulfonyloxyibogaline lactam to 18-cyanoibogaline lactam, and 18-p-toluenesulfonyloxy-4-epi-ibogamine lactam to 18-cyano-4-epi-ibogamine lactam, respectively.

c. A solution of 150 mg of 18-cyanoibogamine lactam in 40 ml of anhydrous tetrahydrofuran is cooled to −70° C with dry-ice acetone. To the solution is dropwise added 1.5 ml of aluminum hydride-tetrahydrofuran solution (1.2 mmol/ml) in nitrogen atmosphere over overnight period of 2 minutes. The reaction mixture is then stirred for 10 minutes at the same temperature and then poured into a cooled mixture of tetrahydrofuran and water to decompose excess of reagent. The resulting mixture is basified with 2N-sodium hydroxide solution and the product is extracted with ether, washed with water, dried over anhydrous sodium sulfate, and then evaporated to dryness. The resulting light yellowish oily material is dissolved in a mixture of petroleum ether-benzene (2 : 1) and then absorbed on 6 g of neutral alumina keeping overnight at room temperature. Eluate with dichloromethane is recrystallized from ether-petroleum ether to yield 124 mg of 18-cyano-7,8-dehydroibogamine having mp. 199°–201° C. IR: $\nu_{max}^{CHCl_3}$ 3446, 2220, 1628, 1463, 1380, 1300, 1144 cm$^{-1}$. Anal. Calcd. for $C_{20}H_{21}N_3$: C, 79.17; H,6.98; N,13.85. Found: C, 78.88; H,7.04; N,13.76.

According to the same procedure, 18-cyanoibogaine lactam is converted to 18-cyano-7,8-dehydroibogaine, 18-cyanotabernanthine lactam to 18-cyano-7,8-dehydrotabernanthine, 18-cyanoibogaline lactam to 18-cyano-7,8-dehydroibogaline, and 18-cyano-4-epi-ibogamine lactam to 18-cyano-7,8-dehydro-4-epi-ibogamine, respectively.

d. A solution of 115 mg of 18-cyano-7,8-dehydroibogamine in 5 ml of methanol is shaken with 200 mg of 10 percent palladium-carbon and 0.1 ml of palladium chloride-hydrochloric acid aqueous solution (corresponding to 1 mg of palladium) in hydrogen atmosphere for 3.5 hours. Catalyst is filtrated off and the reaction mixture is evaporated to dryness under reduced pressure. Water is added and the mixture is basified with 2N-potassium carbonate solution and then extracted with dichloromethane. The extract is washed with water, dried over anhydrous sodium sulfate, and evaporated to dryness under reduced pressure to yield 121 mg of a light yellowish oily material, which is chromatographed on 5 g of neutral alumina. Elutions with petroleum ether-benzene (6 : 1) or benzene afford 93 mg of 18-cyanoibogamine as an oily material. IR: $\nu_{max}^{CHCl_3}$ 3446, 2220, 1463, 1328, 1297, 1010 cm$^{-1}$.

According to the same procedure, 18-cyano-7,8-dehydroibogaine is converted to 18-cyanoibogaine, 18-cyano-7,8-dehydrotabernanthine to 18-cyanotabernanthine, 18-cyano-7,8-dehydroibogaline to 18-cyanoibogaline, and 18-cyano-7,8-dehydro-4-epiibogamine to 18-cyano-4-epi-ibogamine, respectively.

e. To a solution of 80 mg of 18-cyanoibogamine in 3 ml of diethylene glycol is added 550 mg of potassium hydroxide and the solution is heated at 165° C for 22.5 hours in nitrogen atmosphere with stirring. After cooling, the reaction mixture is diluted with 7 ml of anhydrous methanol and then acidified (pH about 1) with 15 percent methanolic hydrochloric acid under ice-cooling. To the resulting acidic solution is then added a solution of diazomethane-ether until the reaction mixture turns into basic and the mixture is kept at room temperature for 15 minutes. Excess of diazomethane is removed off under reduced pressure and water is added. The mixture is then basified with 2N-sodium carbonate solution and the product is extracted with ether. The extract is washed with water, dried over anhydrous sodium sulfate and evaporated to dryness under reduced pressure to yield 83.2 mg of a light yellowish oily material. This material is separated and purified by thin layer chromatography [Kieselguhr-GF: benzene-ethyl acetate (4 : 1)] to yield 41.2 mg of ddl-coronaridine (18-methoxycarbonylibogamine) as an oily material. UV:$\lambda_{max}^{95\%EtOH}$ 223.5 m$\mu$ ($\epsilon$ 32,900), 278.0 (8.250; shoulder), 285.5 (9,030), 294.0 (7,720). IR:

$\nu_{max}^{Nujol}$ 3100, 2480, 1715, 1250, 1037, 990, 743 cm$^{-1}$.
Hydrochloride: mp. 225°– 227° C.

According to the same procedure, 18-cyanoibogaine is converted to dl-voacangine (18-methoxycarbonylibogaine), 18-cyanotabernanthine to dl-isovocangine (18-methoxycarbonyl-tabernanthine), 18-cyanoibogaline to dl-conopharyngine (18-methoxycarbonylibogaline), and 18-cyano-4-epi-ibogamine to dl-4-epi-coronaridine, respectively.

EXAMPLE 2 a. To a solution of 52 mg of 2-indoleacetylisoquinuclidin-6-one in 3 ml of anhydrous benzene is added 41.7 mg of p-toluenesulfonic acid (1-hydrate) and a portion of the solvent is distilled off as azeotropic mixture to dry the solution. Thereafter, the solution is refluxed for 1 hour. The reaction mixture is diluted with ice-water and extracted with dichloromethane and the extract is washed with water, dried over anhydrous sodium sulfate, and then evaporated to dryness to yield 68 mg of 4-desethyl-18-p-toluenesulfonyloxyibogamine lactam. IR: $\nu_{max}^{CHCl3}$ 3455, 1634, 1408, 1173, 966, 912, 898, 883 cm$^{-1}$.

According to the same procedure, 2-(5-methoxyindoleacetyl)-isoquinuclidin-6-one is converted to 4-desethyl-18-p-toluenesulfonyloxyibogaine lactam, 2-(6-methoxyindoleacetyl)-isoquinuclidin-6-one to 4-desethyl-18-p-toluenesulfonyloxytabernanthine lactam, and 2-(5,6-dimethoxyindoleacetyl)-isoquinuclidin-6-one to 4-desethyl-18-p-toluenesulfonyloxyibogaline lactam, respectively.

b. To a solution of 1.37 g of 4-desethyl-18-p-toluenesulfonyloxyibogamine lactam in 60 ml of acetonitrile is added 4.8 g of potassium cyanide and the solution is heated at 60° C for 17 hours and further refluxed for 3 hours. After cooling, the reaction mixture is poured into ice-water and the product is extracted with dichloromethane, washed with water, dried over anhydrous sodium sulfate, and evaporated to dryness under reduced pressure to yield 984.4 mg of residue, which on recrystallization from dichloromethane affords 355.2 mg of the cyano lactam, i.e. 4-desethyl-18-cyanoibogamine lactam, having mp. 302° –304° C. UV: $\lambda_{max}^{EtOH}$ 222 m$\mu$ ($\epsilon$ 36,500), 276 (7,660), 291.5 (6,870). IR: $\nu_{max}^{Nujol}$ 3240, 2240, 1632, 1382, 1138, 991, 742 cm$^{-1}$.

According to the same procedure, 4-desethyl-18-toluenesulfonyloxyibogaine lactam is converted to 4-desethyl-18-cyanoibogaine lactam, 4-desethyl-18-p-toluenesulfonyloxytabernanthine lactam to 4-desethyl-18-cyanotabernanthine lactam, and 4-desethyl-18-p-toluenesulfonyloxyibogaline lactam to 4-desethyl-18-cyanoibogaline lactam, respectively.

c. To a solution of 53 mg of 4-desethyl-18-cyanoibogamine lactam in 7.0 ml of anhydrous tetrahydrofuran is added 0.1 ml of diisobutylaluminum hydride-tetrahydrofuran solution (1.39 mmol/ml) in nitrogen atmosphere under ice-cooling and stirring, and the solution is then stirred for 10 minutes. Then, the solution of diisobutylaluminum hydride in tetrahydrofuran (0.1 ml) is added. The reaction mixture is further stirred for 10 minutes and then aqueous tetrahydrofuran is added to kill excess of reagent. The reaction mixture is then poured into 2N-potassium hydroxide solution and the product is extracted with dichloromethane, washed with water, dried over anhydrous sodium sulfate, and evaporated to dryness. The resulting residue is passed through a column of alumina and the eluates with petroleum ether-benzene (1 : 1) or benzene are recrystallized from dichloromethane-ether to yield 42.2 mg of the cyano enamine derivative, i.e. 4-desethyl-18-cyano-7,8-dehydroibogamine, having mp. 215° – –216° C. UV: $\lambda_{max}^{HCl+EtOH}$ 220.5 m$\mu$ ($\epsilon$ 32,800), 280 (6,850). $\lambda_{max}^{EtOH}$ 235 m$\mu$ ($\epsilon$ 27,500), 278 (10,700). IR: $\nu_{max}^{CHCl3}$ 3460, 2235, 1626, 1462, 1405, 1380, 1300, 1125, 910 cm$^{-1}$. Anal. Calcd. for $C_{18}H_{17}N_3$: C,78.51; H,6.22; N,15,26. Found: C,78.50; H,6.33; N,15.32.

According to the same procedure, 4-desethyl-18-cyanoibogaine lactam is converted to 4-desethyl-18-cyano-7,8-dehydroibogaine, 4-desethyl-18-cyanotabernanthine lactam to 4-desethyl-18-cyano-7,8-dehydrotabernanthine, and 4-desethyl-18-cyanoibogaline lactam to 4-desethyl-18-cyano-7,8-dehydroibogaline, respectively.

d. A solution of 75 mg of 4-desethyl-18-cyano-7,8-dehydroibogamine in 15 ml of methanol is shaken with 150 mg of 10 percent palladium-carbon in hydrogen atmosphere for 2 hours. Catalyst is filtrated off and the filtrate is evaporated under reduced pressure to yield 74 mg of residue, which on recrystallization from dichloromethane-ether affords 60.7 mg of the cyano amine, i.e. 4-desethyl-18-cyanoibogamine, having mp. 224° – 225° C. IR: $\nu_{max}^{CHCl3}$ 3460, 2225, 1459, 1370, 1343, 1330, 1009 cm$^{-1}$.

According to the same procedure, 4-desethyl-18-cyano-7,8-dehydroibogaine is converted to 4-desethyl-18-cyanoibogaine, 4-desethyl-18-cyano-7,8-dehydrotabernanthine to 4-desethyl-18-cyanotabernanthine, and 4-desethyl-18-cyano-7,8-dehydroibogaline to 4-desethyl-18-cyanoibogaline, respectively, e. To a solution of 47 mg of 4-desethyl-18-cyanoibogamine in 1.5 ml of diethylene glycol is added 300 mg of potassium hydroxide and the solution is then heated at 160° –165° C for 11 hours in nitrogen atmosphere with stirring. After cooling, the reaction mixture is diluted with methanol and then acidified with anhydrous hydrochloric acid-methanol solution. Subsequently, an excess of diazomethane-ether solution is added. After the reaction completion, a portion of the solvent is removed off under reduced pressure and then 2N-sodium carbonate solution is added to basify. The product is extract with ether, washed with water, dried over anhydrous sodium sulfate, and evaporated to dryness. The resulting residue is passed through a column of alumina and eluted with a mixture of benzene-dichloromethane (19 : 1 to 4 : 1). The resulting eluate (44.6 mg) is further purified by thin layer chromatography to yield 21.9 mg of crystals, which on recrystallization from methanol afford 15 mg of dl-desethyl-coronaridine (4-desethyl-18-methoxycarbonylibogamine) having mp. 174° – 175° C. IR: $\nu_{max}^{CCl4}$ 3460, 3390, 1728, 1460, 1433, 1373, 1344, 1330, 1230, 1170, 1128, 1068, 1026 cm$^{-1}$. Anal. Calcd. for $C_{19}H_{22}N_2O_2$: C,73.52; H,7.14; N,9.03. Found: C,73.19; H,7.12; N,8.64.

According to the same procedure, 4-desethyl-18-cyanoibogaine is converted to dl-desethylvoacangine (4-desethyl-18-methoxycarbonylibogaine), 4-desethyl-18-cyanotabernanthine to dl-desethylisovoacangine (4-desethyl-18-methoxycarbonyltabernanthine), and 4-desethyl-18-cyanoibogaline to dl-desethylcono-pharyngine (4-desethyl-18-methoxycarbonylibogaline), respectively.

What we claim is:

1. A process for preparing isoquinuclidine derivatives of the general formula:

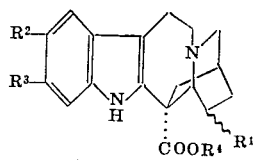

(wherein R¹ is one selected from the group consisting of hydrogen atom and a lower alkyl group; R² and R³ are the same or different and each is one selected from the group consisting of hydrogen atom and a lower alkoxy group; and R⁴ is one selected from the group consisting of methyl and ethyl)

which comprises reacting a compound of the general formula:

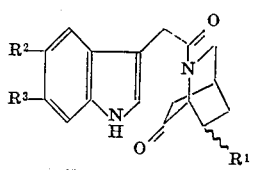

(wherein R¹, R² and R³ each has the same meanings as described above)

with a sulfonic acid selected from the group consisting of methanesulfonic acid, benzenesulfonic acid, p-toluenesulfonic acid, and bromobenzenesulfonic acid to yield a compound of the general formula:

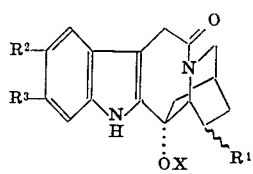

(wherein R¹, R² and R³ each has the same meanings as described above; and X is a sulfonic acid residue)

reacting the latter with a cyano compound selected from the group consisting of sodium cyanide, potassium cyanide and lithium cyanide in a polar solvent to yield a compound of the general formula:

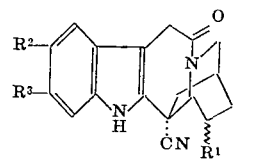

(wherein R¹, R² and R³ each has the same meanings as described above)

subjecting the latter to reduction by a metal hydride to yield a compound of the general formula:

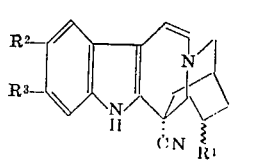

(wherein R¹, R² and R³ each has the same meanings as described above)

catalytically hydrogenating the latter to yield a compound of the general formula:

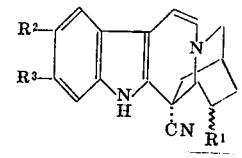

(wherein R¹, R² and R³ each has the same meanings as described above)

and then hydrolyzing the latter in the presence of a catalyst selected from the group consisting of an acid and base followed by esterification.

2. The process claimed in claim 1, the preparation of the compound of the general formula:

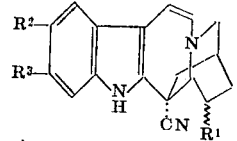

(wherein R¹ is one selected from the group consisting of hydrogen atom and a lower alkyl group; and R² and R³ are the same or different and each is one selected from the group consisting of hydrogen atom and a lower alkoxy group)

is carried out by reducing a compound of the general formula:

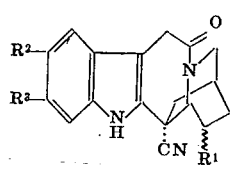

(wherein R¹, R² and R³ each has the same meanings as described above)

with an aluminum hydride under a cooling temperature ranging from 0° to −80° C in an aprotic solvent.

3. The process claimed in claim 2, wherein the aluminum hydride is one selected from the group consisting of aluminum hydride, dimethylaluminum hydride, diethylaluminum hydride, diisobutylaluminum hydride, ethoxyaluminum hydride, diethoxyaluminum hydride, and dichloroaluminum hydride.

4. The process claimed in claim 1, the preparation of the compound of the general formula:

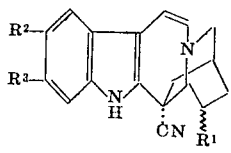

(wherein R¹ is one selected from the group consisting of hydrogen atom and a lower alkyl group; and R² and R³ are the same or different and each is one selected from the group consisting of hydrogen atom and a lower alkoxy group)

is carried out by shaking or stirring a compound of the general formula:

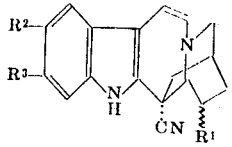

(wherein $R^1$, $R^2$ and $R^3$ each has the same meanings as described above)
with a catalyst in hydrogen atmosphere.

5. The process claimed in claim 4, wherein the catalyst is one selected from the group consisting of palladium black, palladium-carbon, palladium-barium sulfate, rhodium-carbon, rhodium-alumina, platinum oxide, and Raney nickel.

* * * * *